US012459897B2

(12) United States Patent
Watts et al.

(10) Patent No.: US 12,459,897 B2
(45) Date of Patent: Nov. 4, 2025

(54) CONTINUOUS FLOW SYNTHESIS METHOD FOR THE MANUFACTURE OF ISONIAZID

(71) Applicant: NELSON MANDELA UNIVERSITY, Port Elizabeth (ZA)

(72) Inventors: Paul Watts, Port Elizabeth (ZA); Ruvimbo Mangwiro, Randfontein (ZA)

(73) Assignee: NELSON MANDELA UNIVERSITY, Port Elizabeth (ZA)

(*) Notice: Subject to any disclaimer, the term of this patent is extended or adjusted under 35 U.S.C. 154(b) by 862 days.

(21) Appl. No.: 17/767,773

(22) PCT Filed: Apr. 23, 2020

(86) PCT No.: PCT/IB2020/053841
§ 371 (c)(1),
(2) Date: Apr. 8, 2022

(87) PCT Pub. No.: WO2021/069975
PCT Pub. Date: Apr. 15, 2021

(65) Prior Publication Data
US 2023/0142405 A1 May 11, 2023

(30) Foreign Application Priority Data
Oct. 10, 2019 (GB) ..................... 1914685

(51) Int. Cl.
C07D 213/88 (2006.01)
(52) U.S. Cl.
CPC ................. C07D 213/88 (2013.01)
(58) Field of Classification Search
CPC .................................. C07D 213/88
See application file for complete search history.

(56) References Cited

U.S. PATENT DOCUMENTS 2,830,994 A 4/1958 James
5,756,750 A 5/1998 Cao et al.

FOREIGN PATENT DOCUMENTS

| DE | 63493 A2 | 9/1968 | |
|---|---|---|---|
| GB | 787282 A | 12/1957 | |
| WO | 9729087 A1 | 8/1997 | |
| WO | 2014039829 A2 | 3/2014 | |
| WO | WO2014/039829 | * 3/2014 | ......... A61K 31/4409 |

OTHER PUBLICATIONS

Combined Search and Examination Report under Sections 17 and 18(3) dated Nov. 29, 2019 issued by the United Kingdom Intellectual Property Office in corresponding Great Britain Patent Application No. 1914685.1. (6 pages).
International Preliminary Report on Patentability (PCT/IPEA/409) issued in corresponding International Patent Application No. PCT/IB2020/053841 dated Feb. 5, 2021. (13 pages).
International Search Report (PCT/ISA/210) and Written Opinion (PCT/ISA/237) mailed on Jun. 24, 2020, by the European Patent Office as the International Searching Authority for International Application No. PCT/IB2020/053841. (10 pages).
Moll, K.K., "Single State Conversion of Isonicotinonitrile to Isonicotinic Acid Hydrazide", Die Pharmazie, 1968, p. 36, vol. 23, No. 1, VEB Verlag Volk und GesundheitEschborn, Berlin, Germany. (6 pages).

* cited by examiner

Primary Examiner — Paul V Ward
(74) Attorney, Agent, or Firm — BUCHANAN INGERSOLL & ROONEY PC

(57) ABSTRACT

A multistep continuous flow synthesis method for the manufacture of isonicotinyl-hydrazide (Isoniazid) comprising reacting 4-cyano pyridine with NaOH at a specified molar ratio and temperature range to produce the intermediate isonicotinamide, which intermediate is reacted with hydrazine hydrate, without isolation thereof, at a specified molar ratio and temperature range to produce isonicotinyl-hydrazide (Isoniazid) in a yield greater than about 90%.

16 Claims, 3 Drawing Sheets

CONTINUOUS FLOW SYNTHESIS METHOD FOR THE MANUFACTURE OF ISONIAZID

CROSS-REFERENCE TO RELATED APPLICATIONS

This application is the United States National Stage of International Application No. PCT/IB2020/053841, filed on Apr. 23, 2020, which claims priority to United Kingdom Patent Application No. 1914685.1, filed on Oct. 10, 2019, the contents of which are hereby incorporated by reference in their entireties.

INTRODUCTION

This invention relates to a multistep continuous flow synthesis method for the manufacture of Isoniazid, in particular, but not exclusively to a continuous flow synthesis method producing an Isoniazid yield in excess of 90%.

BACKGROUND

There are numerous processes and synthetic routes described in the prior art for the preparation of Isoniazid.

However, existing synthesis methodologies for the production of these compounds have all been based on standard stirred batch reactor type processes, wherein significant volumes of organic solvents are used. In addition, these processes typically isolate process intermediates at each step of the process, thereby further increasing the usage of solvents. The relatively high cost of APIs produced in this manner is therefore largely based on this reliance on organic solvents, and the inherent process inefficiencies leading from the isolation of intermediates.

Micro reactor technology (MRT), more recently branded 'flow chemistry', is an emerging technique that enables those working in research and development to rapidly screen reactions utilising continuous flow, leading to the identification of reaction conditions that are suitable for use at a production level. Furthermore, in addition to using conventional reaction methodology, the inherent safety associated with the use of small reactor volumes enables users to employ reaction conditions previously thought to be too hazardous for use within a production environment; such as extreme reaction conditions or the use/generation of 'hazardous' compounds. Consequently, the type of reactions available to the chemist increases through the use of this technology. To date there is no process for the production of Isoniazid based on flow chemistry methodology.

There is therefore a need for an improved method for the manufacture of Isoniazid. In particular, there is a need for a fully continuous multistep flow synthesis method for the manufacture of Isoniazid, the method preferably producing an Isoniazid yield in excess of 90%.

SUMMARY OF THE INVENTION

According to a first aspect of the present invention there is provided a multistep continuous flow synthesis method, suitable for producing a yield greater than about 90%, for the manufacture of isonicotinyl-hydrazide of Formula 1

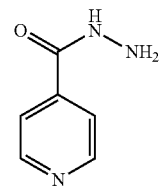

comprising the steps of:
a) reacting 4-cyano pyridine of Formula 12

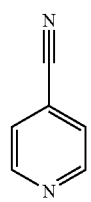

with NaOH in a molar ratio of 4-cyano pyridine:NaOH of about 1:0.1 to about 1:0.7 at a temperature of about 90° C. to about 105° C. to produce the intermediate isonicotinamide of Formula 13

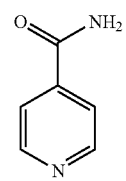

b) reacting the intermediate isonicotinamide of Formula 13 with hydrazine hydrate in a molar ratio of 4-cyano pyridine:hydrazine hydrate of about 1:1.75 to about 1:2.50 at a temperature of about 100° C. to about 120° C., wherein the reaction in step a) has a residence time of about 7 to about 32 minutes, and the reaction in step b) has a residence time of about 10 to about 25 minutes.

In one embodiment, in step a) the 4-cyano pyridine is dissolved in a mixture of water and alcohol, including methanol.

In a preferred embodiment, the water and alcohol mixture has a ratio of alcohol:water of about 7:3.

In one embodiment, in step a) the molar ratio of 4-cyano pyridine to NaOH is about 1:0.15 to about 1:0.6, or about 1:0.15 to about 1:0.4.

In a preferred embodiment, in step a) the molar ratio of 4-cyano pyridine to NaOH is about 1:0.2.

In one embodiment, in step a) the temperature is about 90° C. to about 100° C., or about 95° C. to about 100° C.

In a preferred embodiment, in step a) the temperature is about 95° C.

In a preferred embodiment, in step a) the residence time is about 10 to about 15 minutes.

In a particularly preferred embodiment, in step a) the residence time is about 10 minutes.

In one embodiment, in step b) the molar ratio of 4-cyano pyridine:hydrazine hydrate is about 1:1.75 to about 1:2.25.

In a preferred embodiment, in step b) the molar ratio of 4-cyano pyridine:hydrazine hydrate is about 1:2.0.

In another embodiment, in step b) the temperature is about 100° C. to about 115° C., or about 105° C. to about 115° C.

In a preferred embodiment, in step b) the temperature is about 105° C.

In a preferred embodiment, in step b) the residence time is about 10 to about 20 minutes.

In a particularly preferred embodiment, in step b) the residence time is about 10 minutes.

In a preferred embodiment, the total multistep continuous flow synthesis method yield for isonicotinyl-hydrazide from 4-cyano pyridine is greater than about 92%, greater than about 94%, or greater than about 95%.

In a particularly preferred embodiment, the total multistep continuous flow synthesis method yield for isonicotinyl-hydrazide from 4-cyano pyridine is about 96%.

BRIEF DESCRIPTION OF THE DRAWINGS

The invention will now be described in more detail with reference to the following non-limiting embodiments and figures in which.

DETAILED DESCRIPTION OF A PREFERRED EMBODIMENT

The present invention will now be described more fully hereinafter with reference to the accompanying figures, in which some of the non-limiting embodiments of the invention are shown.

The invention as described hereinafter should not be construed to be limited to the specific embodiments disclosed, with slight modifications and other embodiments intended to be included within the scope of the invention.

Although specific terms are employed herein, they are used in a generic and descriptive sense only and not for purposes of limitation.

As used herein, throughout this specification and in the claims which follow, the singular forms "a", "an" and "the" include the plural form, unless the context clearly indicates otherwise.

The terminology and phraseology used herein is for the purpose of description and should not be regarded as limiting. The use of the terms "comprising", "containing", "having", "including", and variations thereof used herein, are meant to encompass the items listed thereafter, and equivalents thereof as well as additional items.

Where used in this specification, the terms "fully continuous flow synthesis method", "multistep continuous flow synthesis method", and "fully continuous multistep flow synthesis method" are used interchangeably and should be understood to mean a flow synthesis process, i.e. a process using micro reactor technology, comprising a number of steps, wherein the final product of the process is obtained without the isolation of any intermediate.

Figure 1:
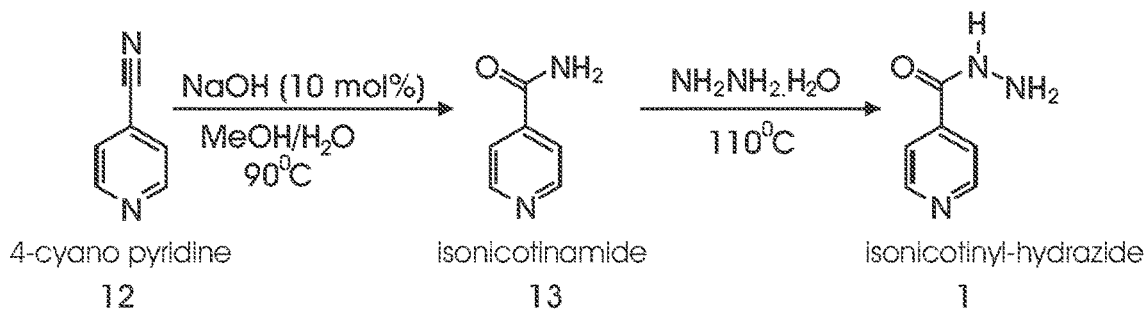
FIG. 1 shows a schematic representation of a general synthesis method of the invention.

The present invention provides for a method for the manufacture of Isoniazid in a fully continuous flow synthesis method. FIG. 1 shows a schematic representation of the general synthesis method, and synthesis steps, of one embodiment of the invention for making Isoniazid.

The continuous flow synthesis method towards Isoniazid shown in FIG. 1 is a two-step reaction performed with the use of microreactor technology. Generally, the first reaction towards Isoniazid is the hydrolysis of 4-cyano pyridine 12 to produce isonicotinamide 13 in a first microreactor, or a first part of a suitable microreactor setup. The isonicotinamide 13 is reacted with hydrazine hydrate in a second microreactor, or a second part of a suitable microreactor setup, which is in constant fluid communication with the first microreactor, or the first part of the microreactor.

Figure 2:
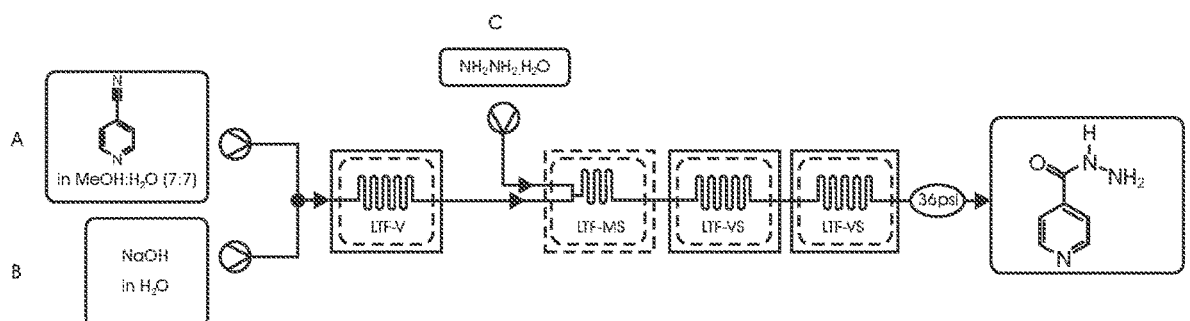
FIG. 2 shows a schematic representation of the setup used to investigate the preparation of isonicotinyl-hydrazide 1 as a multi-step continuous process.

One example of a microreactor setup for the implementation of the method of the invention is shown in FIG. 2. As can be seen from FIG. 2, a continuous flow reaction setup for implementing the invention may be constructed by using two syringe pumps, three syringes, and various reactor plates. The system may include check valves for unilateral flow, and a back pressure regulator. The temperature of the reactor plates may be controlled, for example by using oil baths, or in any other manner known in the art. It will be appreciated by those of ordinary skill in the art that various details of the experimental setup, as described above, may be modified, thereby arriving at further embodiments, but that these embodiments will remain within the scope of the invention.

The compatibility of reagents and solvents are particularly important in flow systems to ensure that products and intermediates remain in solution. Incorrect solvents, reagent ratios, reagent concentrations, reaction temperatures, and other reaction conditions, can lead to precipitation of reagents. Precipitation not only affects the reactions efficiencies, but result in system blockages, in turn leading to a build-up of pressure in the system. Systems blockages will result in costly system downtime, and the overall inefficiency of the reaction.

The individual synthesis step of the method according to the invention will now be described in more detail with reference to the following non-limiting experimental examples and analytical data.

Experimental Parameters

All the chemicals used were purchased from Merck, Sigma Aldrich and Industrial Analytical. They were used as received without further purification.

Reaction progress was monitored by thin layer chromatography (TLC). TLC was carried out on layer thickness 250 μm E. Merck silica gel plates (60F-254) using hexane and ethyl acetate (80:20 v/v) as mobile phase. The detection of spot was accomplished by using a Camag UV detector cabinet at 254 nm. Purity of the compounds was ascertained by a single spot on TLC sheet.

$^1$H and $^{13}$C Nuclear magnetic resonance (NMR) spectra were recorded using Bruker spectrometer (Bruker Ultrashield™ 400 plus) which was operated at 400 MHz for proton and 100 MHz for carbon. Spectra were calibrated using the residual $^1$H chemical shift in DMSO-$d_6$ (2.62 ppm)

which was used as the internal reference standard. The chemical shift values for all spectra are given in parts per million (ppm).

4-Cyanopyridine 12, isonicotinamide 13, isonicotinyl-hydrazide 1 and isonicotinic acid 15 were determined by analytical high-performance liquid chromatography (HPLC). Analysis by HPLC was carried out using an Agilent 1220 Infinity LC instrument equipped with a diode array detector (DAD) fitted with an Agilent Eclipse Plus C18 reverse phase column. HPLC grade methanol (organic mobile phase) from Merck was used. To obtain a buffer (aqueous mobile phase) with pH of 7.0, the solution was prepared by adding 29.1 mL of 0.1 M sodium hydroxide to 50 mL of 0.1 M potassium dihydrogen phosphate (analytical grade) in 1000 mL deionized water. The buffer was degassed by sonication combined with vacuum filtration. A 0.45 µM Whatmann filter paper was used during degassing. The organic mobile phase was also degassed before use. The chromatographic separation was achieved using an isocratic solvent system. HPLC parameter settings are provided in the table below.

| Instrument component | | Condition |
| --- | --- | --- |
| Stationary phase | | Agilent Eclipse Plus C18 (5 µm, 4.6 × 250 mm) |
| Mobile phase | A (aqueous solvent)- 97.5% | Aqueous buffer 0.1M phosphate buffer (pH 7) |
| | B (organic solvent)- 2.5% | Methanol |
| Flow rate | | 1.0 mL/min |
| Injection volume | | 5 µl |
| Column Temperature | | 30° C. |
| Optimum detection wavelengths | | 254 nm and 263 nm |
| Detection lamp | | UV |
| Run time | | 35 min |

The FTIR characteristic peaks identifying the functional groups in a sample were recorded on a Bruker Alpha spectrophotometer with an ATR fitting. The analyses of samples were recorded in the range 4000-400 cm$^{-1}$ and the peaks are reported in wavenumbers (cm$^{-1}$). The solid and liquid samples were analyzed without any modification. Quantification was done using OPUS manager software.

GC was carried out on Agilent 7820A instrument using a HP-5 column (30 m×320 µm×0.5 µm). Flame ionization detector was used for the detection of the samples. A split-split less inlet was employed. GC parameter settings are provided in the table below.

To confirm purity of synthesized compounds, melting point was determined using the Stuart SMP10 digital apparatus. Prior to analysis, analyte samples had to be dried overnight in a vacuum desiccator. A small amount of powdered analyte sample was packed to a depth of about 4 mm in a glass capillary tube sealed at one end. The Stuart apparatus was set at a plateau temperature of 60° C.

| INSTRUMENT COMPONENTS | | CONDITIONS |
| --- | --- | --- |
| Autosampler | Carrier gas | Nitrogen (N$_2$) |
| | Carrier gas flow | 1 mL/min |
| | Injection volume | 1 µL |
| Detector | FID temperature | 300° C. |
| | Injector temperature | 250° C. |
| Oven | Initial even temperature | 70° C. |
| | Initial hold-up time | 2 min |
| | Ramp 1 temperature | 140° C. |
| | Ramp 1 holdup time | 3 min |
| | Ramp 1 rate | 70° C./min |
| | Ramp 2 temperature | 325° C. |
| | Ramp 2 holdup time | 7 min |
| | Ramp 2 rate | 50° C./min |
| | Final column temperature | 325° C./min |
| Inlet | Mode | Split |
| | Split flow | 17 mL/min |
| | Split ratio | 20:1 |
| | Inlet temperature | 250° C. |
| | Run time | 16.7 min |

Synthesis Step 1: Preparation of isonicotinamide 13

Scheme 1: Preparation of compound 13

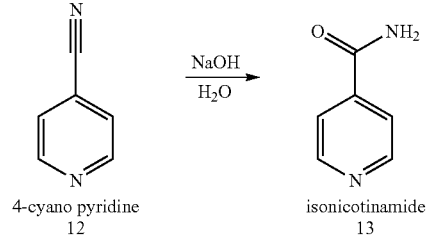

4-cyano pyridine
12 isonicotinamide
13

Scheme 1 shows the first synthesis step of the method in which 4-cyano pyridine 12 is converted to isonicotinamide 13 in the presence of aqueous sodium hydroxide. This first step of the method was fully developed before consideration was given to the introduction of hydrazine hydrate in the second step of the reaction.

Figure 3:
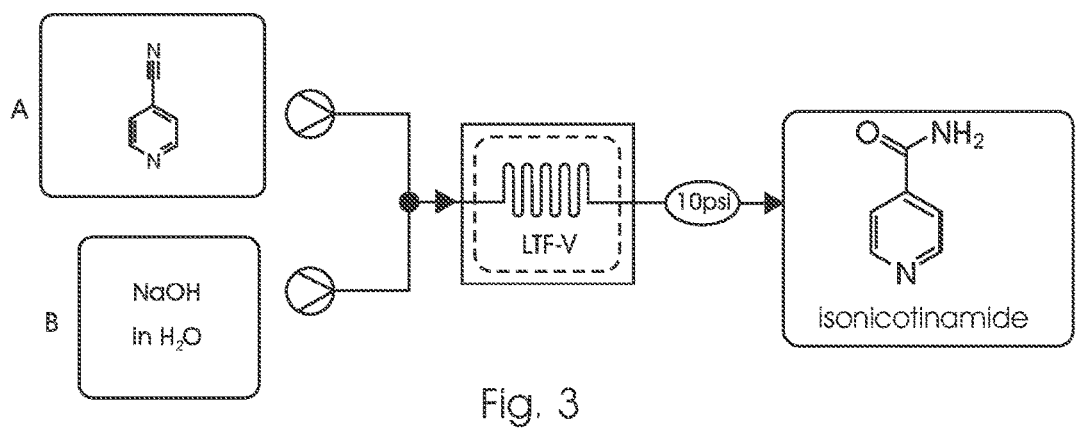
FIG. 3 shows a continuous flow setup for the synthesis of isonicotinamide through hydrolysis of 4-cyanopyridine.

These reactions were conducted using the microreactor setup shown in FIG. 3. This microreactor setup was constructed by using a Chemyx fusion 200 modular syringe pump, 10 mL SGE glass syringes and borosilicate glass plate reactors LTF-V (volume: 1.7 mL, channel size: 1 mm, geometry: 115×60×6 mm) and LTF-VS (volume: 1.1 mL, channel size: 1 mm, geometry: 15×60×6 mm). The SGE glass syringes were connected to one microreactor plate via PTFE tubing of 0.5 mm internal diameter. The reagents pumped from the two syringes were mixed using a three-way t-connector (Omnifit labware, Pore size: 8.0 mm ID, 0.5-4 mm OD) placed before the microreactor. To allow unilateral flow of reactant solutions, check valves (CV Outlet: 3302, ¼-28M to ¼-28F and CV Inlet: 3301, ¼-28M to ¼-28F, 15 psi) were connected in-line from each of the two reactants flow streams as illustrated in FIG. 3.

The microreactor was submersed in a temperature control oil bath and delivery of the reactants to the plate was enabled by one Chemyx fusion 200 modular syringe pump which was holding the two syringes. A 10 psi back pressure regulator (BPR) was fitted in-line between the reactor outflow and the collection vial. Preliminary experiments summarised in Table 1 below showed that the microreactors gave comparable performance.

TABLE 1

Summary of conditions and results for preliminary experiments with the LTF-V and LTF-VS reactor plates.

| Reactor | [12] (M) | [NaOH] | T (° C.) | $R_t$ (min) | Conversion of 12 (%) | Selectivity (%) |
|---|---|---|---|---|---|---|
| LTF-V | 0.5 | 0.05 | 90 | 15 | 85 | 93 |
| LTF-VS | 0.5 | 0.05 | 90 | 15 | 81 | 89 |

Reaction Solvent

The compatibility of reagents and solvent is particularly important in flow systems to ensure that products and intermediates remain in solution. Incorrect solvents, and other reaction conditions, can lead to precipitation of reagents and the build-up of pressure. The two solvent systems investigated were water and a water and methanol mixture. Although methanol was used in these experiments, the skilled person would appreciate that similar lower alcohols, such as ethanol, would be equally suitable as reaction solvent. The effect of reaction temperature was briefly, and simultaneously, considered.

In the first preliminary experiment, a solution of 4-cyanopyridine (0.5 M) in water and sodium hydroxide (0.05 M) in water were fed into a microreactor using two syringes. In the second preliminary experiment, a solution of 4-cyanopyridine (0.5 M) in a 7:3 mixture of methanol/water, and sodium hydroxide (0.05 M) were fed into a microreactor using two syringes. The reactions were conducted at temperatures of 40° C. and 90° C. respectively, with a residence time of 15 min. Samples were collected and analysed using off-line HPLC and GC.

It was observed that the use of water only resulted in precipitation of solids in the channels of the reactor, thereby decreasing the conversion towards the desired intermediate, isonicotinamide 13. The formation of precipitates within a continuous flow system is highly undesirable as it results in blockage of the connectors, eventually leading to build-up of pressure within the system. It is therefore important to select appropriate solvents for the reactions so that the products and intermediates remain in solution.

The presence of the water miscible solvent methanol aided in dissolving 4-cyanopyridine, and resultant reaction products and by-products, and precipitation within the reaction channels and connectors was not observed. The results of these experiments, summarised in Table 2 below, shows that the use of an alcohol, such as methanol, and increased temperature promoted the nitrile hydrolysis reaction.

TABLE 2

Summary of conditions and results for experiments with water and a MeOH:water blend, wherein [12] is the concentration of 4-cyanopyridine.

| Run | [12] (M) | [NaOH] | Solvent system | T (° C.) | $R_t$ (min) | Conversion (%) |
|---|---|---|---|---|---|---|
| 1 | 0.5 | 0.05 | Water | 40 | 15 | 35 |
| 2 | 0.5 | 0.05 | Water | 90 | 15 | 62 |
| 3 | 0.5 | 0.05 | MeOH/water (7:3) | 40 | 15 | 48 |
| 4 | 0.5 | 0.05 | MeOH/water (7:3) | 90 | 15 | 83 |

The Effect of Reagent Molar Equivalence on Conversion Towards Isonicotinamide 13

The molar equivalence of alkaline base to nitrile within the reaction is crucial to attain reaction control, particularly with respect to reaction selectivity. The effect of base concentration was evaluated for the preparation of isonicotinamide 13 using the following procedure.

A standard solution of 4-cyanopyridine 12 (0.50 M) in MeOH/water (7:3) solution was added from a first syringe (A), and sodium hydroxide (0.04 M) in deionized water was added from a second syringe (B). In order to maintain a constant reaction temperature (90° C.) the microreactors were submerged in a temperature controlled oil bath. The reaction product was collected in a vial after a residence time of 15 min to get an indication of reaction times prior to further investigations. In order to investigate the effect of relative stoichiometry ratios of reagents (4-cyanopyridine 12 and sodium hydroxide) on conversion towards product 13, the experiment was repeated using different solutions of sodium hydroxide with varying concentrations ranging from 0 to 0.75 M. The product from each flow reaction was collected in a vial and analysis was performed using off-line HPLC. Table 3 below shows a summary of the reaction parameters used and the results obtained (see FIG. 4).

TABLE 3

Reaction parameters used to study effect of molar equivalence on conversion of 12 towards isonicotinamide 13, wherein [12] is the concentration of 4-cyanopyridine.

| Reaction | [12] (M) | Molar equiv relative to 12 | [NaOH] (M) | $R_t$ (min) | T (° C.) | Conversion of 12 (%) | Conversion towards 13 (%) |
|---|---|---|---|---|---|---|---|
| 1 | 0.50 | 0 | 0 | 15 | 90 | 5.5 | 5.5 |
| 2 | 0.50 | 0.08 | 0.04 | 15 | 90 | 79.2 | 79.2 |
| 3 | 0.50 | 0.1 | 0.05 | 15 | 90 | 83.7 | 83.7 |
| 4 | 0.50 | 0.15 | 0.08 | 15 | 90 | 93.1 | 88.6 |
| 5 | 0.50 | 0.2 | 0.10 | 15 | 90 | 100 | 96.9 |
| 6 | 0.50 | 0.4 | 0.20 | 15 | 90 | 100 | 92.1 |
| 7 | 0.50 | 0.6 | 0.30 | 15 | 90 | 100 | 86.9 |
| 8 | 0.50 | 0.8 | 0.40 | 15 | 90 | 100 | 78.4 |
| 9 | 0.50 | 1 | 0.50 | 15 | 90 | 100 | 71.8 |
| 10 | 0.50 | 1.5 | 0.75 | 15 | 90 | 100 | 35.1 |

Figure 6:
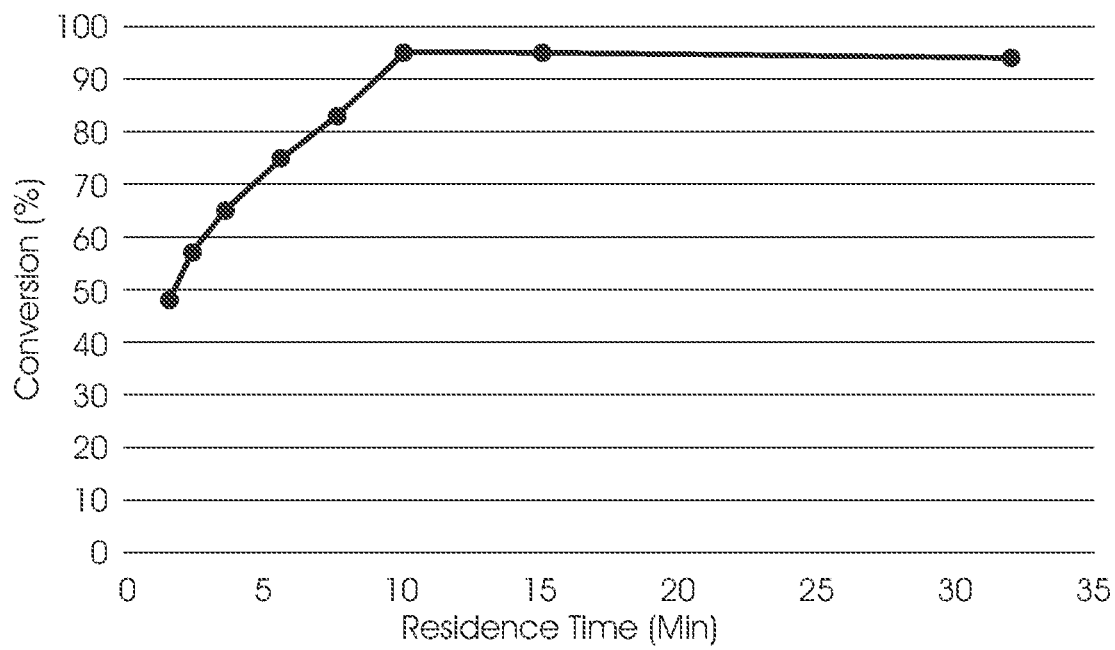
FIG. 6 shows the effect of residence time on conversion of 12 towards 13.

Analysis of the reaction samples provides initial information on whether the reaction is complete, as well as possible side products. During analysis of samples in this optimization experiments, three prominent peaks were observed on the HPLC chromatograms. The first peak corresponds to the nitrile substrate 12, the other to the amide product 13, and the other to the by-product, isonicotinic acid 15. Substrate conversion was thus measured directly, and from the ratio, reaction selectivity was calculated. Conversion towards amide product 13 was used to determine optimal reaction conditions. FIG. 6 shows a comparison between conversion towards the desired isonicotinamide 13 and the conversion towards the by-product compound, isonicotinic acid 15.

Figure 4:
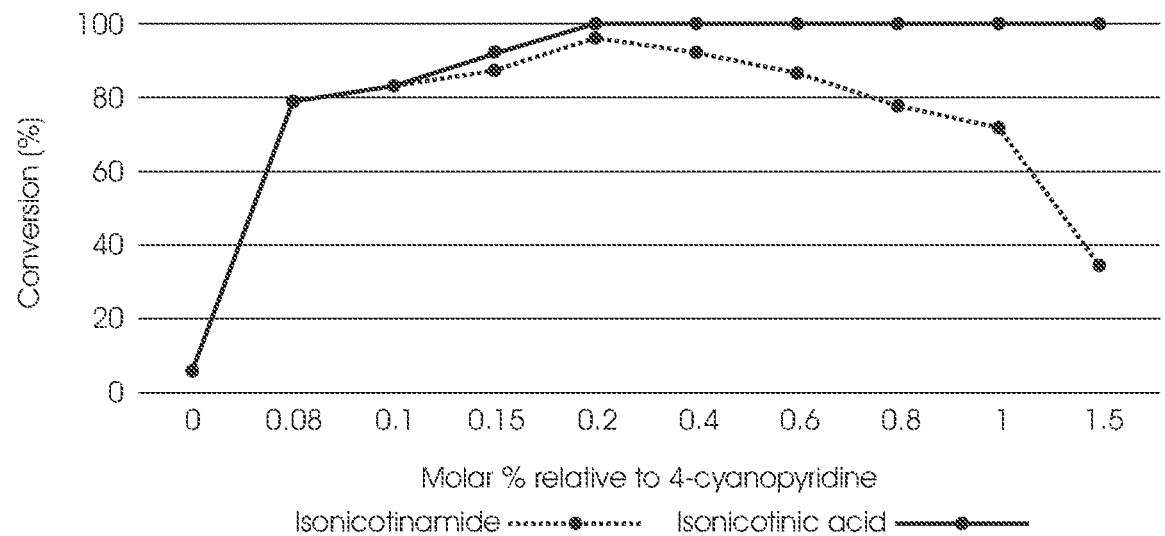
FIG. 4 shows the effect of sodium hydroxide relative molar % on conversion towards 13 and by-product 15 formation.

As can be seen from FIG. 4, a conversion of 5% was obtained in the absence of any base. Since the nitrile group is not particularly reactive, addition of alkaline catalyst is required to improve the reactivity of 4-cyanopyridine 12. However, the amount required for this reaction to result in desirable yield and selectivity in continuous flow systems as such was unknown. It became apparent that there was an increase in conversion of compound 12 as the molar ratio of compound 12:sodium hydroxide increased. Maximum conversion of 100% was obtained when a minimum of 0.134 M (0.2 molar equiv) of sodium hydroxide was used.

Increasing concentration of sodium hydroxide however, also had adverse effects on selectivity of amide 13 even when the results showed 100% conversion of compound 12. Preferably, the molar ratio of 4-cyano pyridine 12 to sodium hydroxide is in the range of about 1:0.1 to about 1:0.7, including any particular ratio falling within this range, such as about 1:0.15, about 1:0.2, about 1:0.25, about 1:0.3, about 1:0.35, about 1:0.4, about 1:0.45, about 1:0.5, about 1:0.55, about 1:0.6, about 1:0.65, and about 0.7. Preferably, the molar ratio of 4-cyano pyridine 12 to sodium hydroxide is in the range of about 1:0.15 to about 1:0.6, or about 1:0.15 to about 1:0.4.

The Effect of Residence Time on Conversion Towards Isonicotinamide 13

A solution of 4-cyanopyridine 12 (0.50 M) in MeOH/water (7:3) solution was added from a first syringe (A), and a solution of sodium hydroxide (0.10 M, 0.2 molar equiv) in deionized water was pumped from a second syringe (B). The reaction product was collected in a vial at different residence times. The reactions were performed at a constant temperature of 90° C. The effect of residence time on the conversion to isonicotinamide 13 was investigated at eight different flow rates, with residence times ranging from 1.5-32 min.

TABLE 4

Reaction parameters for the investigation into the effect of residence times on the conversion of 4-cyanopyridine 12.

| Reaction | [12] (M) | [NaOH] (M) 0.2equiv | $R_t$ (min) | T (° C.) | Conversion of 12 (%) | Conversion towards 13 (%) |
|---|---|---|---|---|---|---|
| 1 | 0.50 | 0.10 | 32 | 90 | 100 | 94 |
| 2 | 0.50 | 0.10 | 15 | 90 | 100 | 95 |
| 3 | 0.50 | 0.10 | 10 | 90 | 98 | 95 |
| 4 | 0.50 | 0.10 | 7.6 | 90 | 87 | 83 |
| 5 | 0.50 | 0.10 | 5.5 | 90 | 78 | 75 |
| 6 | 0.50 | 0.10 | 3.5 | 90 | 68 | 65 |
| 7 | 0.50 | 0.10 | 2.3 | 90 | 60 | 57 |
| 8 | 0.50 | 0.10 | 1.5 | 90 | 52 | 48 |

As can be seen from the results presented in Table 4 above, and the graph in FIG. 6, conversion of 12 increased with increase in residence time, and reaching a desirable conversion from a residence time of about 7 min. Preferably, the residence time for the conversion of 12 to 13 is from about 7 min to about 32 min, including any duration within this range. For example, the residence time can be about 7 min, about 8 min, about 9 min, about 10 min, about 11 min, about 12 min, about 13 min, about 14 min, about 15 min, about 16 min, about 17 min, about 18 min, about 19 min, about 20 min, about 21 min, about 22 min, about 23 min, about 24 min, about 25 min, about 26 min, about 27 min, about 28 min, about 29 min, about 30 min, about 31 min, and about 32 min. Preferably, the residence time for the conversion of 12 is about 7 min to about 20 min, about 7 to about 15 min, or about 10 to about 15 min.

The Effect of Reaction Temperature on Conversion Towards Isonicotinamide 13

The effect of reaction temperature was investigated for the preparation of 13 using the following experimental procedure. A standard solution of 4-cyanopyridine 12 (0.50 M) in MeOH/H$_2$O (7:3) solution was placed in a first syringe (A), and a solution of sodium hydroxide (0.10 M) in deionized water was placed in a second syringe (B). The effect of temperature on both product selectivity and conversion was investigated at temperatures between 80° C. and 110° C. The temperature of the solutions in the microreactor was controlled by a constant temperature bath. The product from each flow reaction was collected in a vial and analyzed immediately using off-line HPLC. To ensure the results obtained were due to the reaction occurring within the micro channels, immediate cooling of the collected sample was achieved by submerging the sealed vial containing the sample into a beaker of water at room temperature. The different parameters used experiment are summarized in Table 5 below.

TABLE 5

The effect of temperature on conversion of 12 towards 13.

| Reaction | [12] (M) | [NaOH] (M) 0.2equiv | T (° C.) | $R_t$ (min) | Conversion of 12 (%) | Conversion towards 13 (%) |
|---|---|---|---|---|---|---|
| 1 | 0.50 | 0.10 | 80 | 10 | 74 | 71 |
| 2 | 0.50 | 0.10 | 85 | 10 | 82 | 78 |
| 3 | 0.50 | 0.10 | 90 | 10 | 94 | 90 |
| 4 | 0.50 | 0.10 | 95 | 10 | 99 | 95 |
| 5 | 0.50 | 0.10 | 100 | 10 | 100 | 95 |
| 6 | 0.50 | 0.10 | 105 | 10 | 100 | 91 |
| 7 | 0.50 | 0.10 | 110 | 10 | 100 | 85 |

Figure 5:
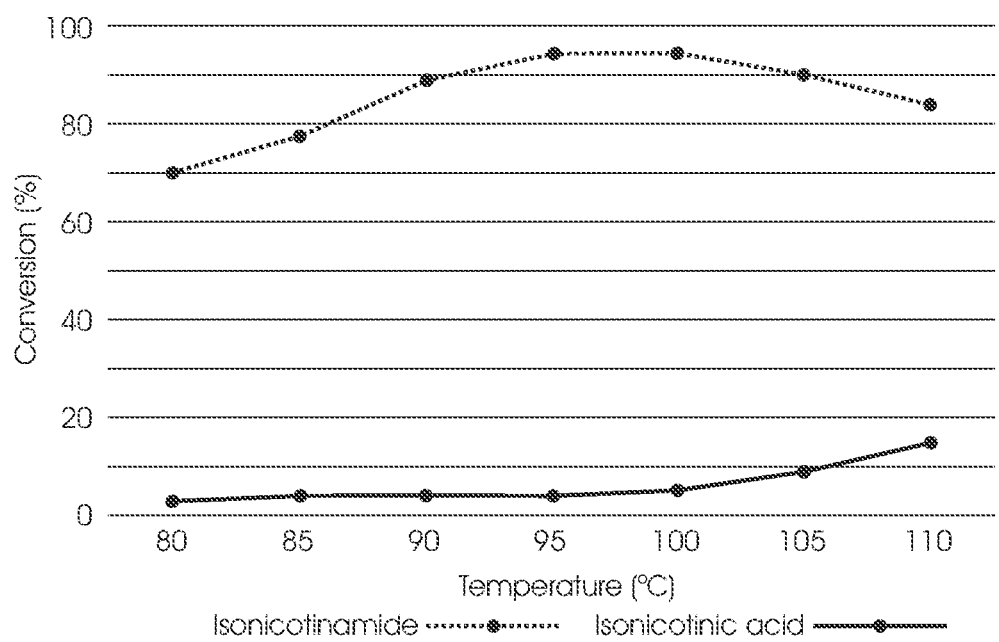
FIG. 5 shows the effect of temperature on conversion towards 13 and by-product 15 formation.

Conversion of 12 gradually increased with increase in temperature reaching 100% conversion after 95° C. As can be seen from FIG. 5, the results indicate that conversion towards 13 was influenced by reaction temperature. As temperature increased gradually from 80-95° C., conversion towards amide product also increased to a certain level (about 95%) after which it started to decrease as by-product 15 was increasingly being produced. Without thereby wishing to be bound by any particular theory, it is believed that as the temperature continued to increase, the reaction favoured acid formation, thereby not improving conversion to amide. Preferably, the reaction temperature for the conversion of compound 12 to compound 13 is about 90 to about 105° C., more preferably about 90 to about 100° C.

From the results obtained in this study, optimum conversion towards isonicotinamide was found using a temperature of 95° C. This temperature enabled 99% conversion of 12 with less by-product (4%) formation, resulting in highest selectivity of 96% towards isonicotinamide 13. All subsequent reactions were performed using these optimal conditions: residence time of 10 min and temperature of 95° C.

The Effect of the Concentration of 4-Cyanopyridine 12 on Conversion Towards Isonicotinamide 13

The effect of the concentration of compound 12 was investigated in a range of 0.08 M-1 M. The concentration of 12 was varied, while keeping the relative molar equivalence between 12 and NaOH constant. The effect of concentration was investigated using the following experimental procedure.

Using two SGE glass syringes and PTFE tubing (ID 0.5 mm), 4-cyanopyridine (0.08 M in MeOH/H$_2$O 7:3) and sodium hydroxide (0.016 M) were fed into an LTF-V microreactor. After a residence time of 10 min, a sample was collected and analyzed. The reaction was repeated using different concentrations of 4-cyanopyridine 12 and sodium hydroxide as shown in Table 6 below. The molar equivalence between compound 12 and sodium hydroxide was kept constant at 1:0.2. Total conversion and selectivity was determined using off-line HPLC.

TABLE 6

Reaction parameters used to investigate the effect of the concentration of compound 12 on conversion towards 13.

| Reaction | [12] (M) | [NaOH] (M) 0.2equiv | T (° C.) | $R_t$ (min) | Conversion of 12 (%) | Conversion towards 13 (%) |
|---|---|---|---|---|---|---|
| 1 | 0.080 | 0.016 | 95 | 10 | 41 | 41 |
| 2 | 0.100 | 0.020 | 95 | 10 | 52 | 51 |
| 3 | 0.125 | 0.025 | 95 | 10 | 59 | 59 |
| 4 | 0.170 | 0.034 | 95 | 10 | 75 | 75 |
| 5 | 0.250 | 0.050 | 95 | 10 | 94 | 91 |
| 6 | 0.500 | 0.100 | 95 | 10 | 99 | 95 |
| 7 | 0.670 | 0.134 | 95 | 10 | 100 | 96 |
| 8 | 1.000 | 0.200 | 95 | 10 | 95 | 90 |

From the results presented in Table 6 above, it can be seen that the conversion of 4-cyanopyridine 12 is influenced by the concentration of the reagent 12. Generally, an increase in 4-cyanopyridine concentration resulted in an increase in the amount of product formed. However, surprisingly, the same trend was not followed for higher concentrations. Increasing the concentration of 12 to 1 M resulted in a noticeable decrease in conversion (5%).

Synthesis Step 2: Preparation of isonicotinyl-hydrazide (Isoniazid) 1

Scheme 2: Preparation of compound 1

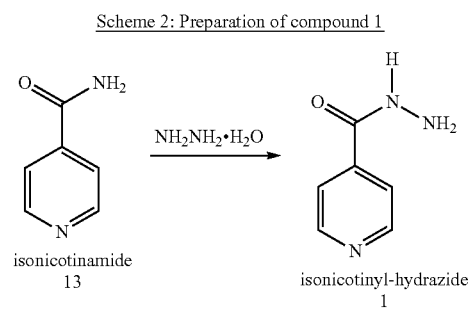

isonicotinamide 13 → isonicotinyl-hydrazide 1

Scheme 2 shows the reaction step for the conversion of the intermediate isonicotinamide 13 to isonicotinyl-hydrazide (Isoniazid) 1. The preparation of product 1 was investigated over a two-step synthesis route, as is shown in FIG. 2, wherein the investigations into the second synthesis step, i.e. the reaction of intermediate compound 13 with hydrazine shown above, was conducted continuously with the in situ prepared compound 13.

This continuous flow reaction setup was constructed by using two Chemyx fusion 200 modular syringe pumps, three 10 mL SGE glass syringes (first two syringes controlled by one pump, one syringe controlled by the other pump) and different Little Things Factory (LTF) glass reactor plates fitted with 0.5 mm ID PTFE tubing. These reactor plates include: one LTF-V residence plate (reactor volume: 1.7 mL, channel size: 1 mm, geometry: 115×60×6 mm), one LTF-MS micro mixer (reactor volume: 0.2 ml, channel size: 1 mm, geometry: 115×60×6 mm) and two LTF-VS residence plates (reactor volume: 1.1 mL, channel size: 1 mm, geometry: 115×60×6 mm). The system also consisted of check valves (CV Outlet: 3302, ¼—28M to ¼—28F and CV Inlet: 3301, ¼—28M to ¼—28F) for unilateral flow, and a 35 psi back pressure regulator. These reactor plates were arranged in two temperature oil baths where the first bath contained two plates: a single LTF-V residence plate (for synthesis of amide 13) and a single LTF-MS mixing plate which contain two input channels (one from LTF-V residence plate continuous flow and second one as hydrazine hydrate inlet into flow stream). The second bath contained two LTF-VS residence plates (for isonicotinyl-hydrazide 1 synthesis). An LTF-MS micromixer was used to introduce hydrazine hydrate into the flow reaction. Intensive mixing is required in the second step of the reaction thus LTF-VS plates were used. Two residence plates were used during step two merely to increase residence time.

The Effect of Residence Time on Conversion Towards Isonicotinyl-Hydrazide 1

Using the experimental setup illustrated in FIG. 2, a standard solution of 4-cyanopyridine 12 (0.67 M in MeOH/H2O 7:3) was added from a first syringe (A), a solution of sodium hydroxide (0.134 M, 0.2 equiv) was added from a second syringe (B) and a solution of hydrazine hydrate (1.34 M, 2.0 equiv) was added from a third syringe (C). A residence time of 10 min and a bath temperature of 95° C. was used for the synthesis of intermediate compound 13, which was formed in situ.

In order to investigate the effect of residence time (in the second part of the microreactor setup) on conversion to product 1, a range of flow rates after addition of hydrazine hydrate were investigated. Hydrazine hydrate was pumped into the system flow rates ranging between 0.05-0.3 mL/min. This resulted in residence times of between 2-25.2 min for the hydrazine reaction, in this particular reactor setup. Temperature for the hydrazine reaction was kept constant at 110° C. The products were collected in vials and analyzed using HPLC. Table 7 below shows the reaction parameters used in this optimization experiment.

TABLE 7

The reaction parameters used to investigate effect of the hydrazine reaction residence time on conversion towards 1.

| Reaction | [12] M | [NaOH] M | [Hydrazine hydrate] (M) | T (° C.) Step 1 | T (° C.) Step 2 | $R_t$ (min) | Conversion towards 1 (%) |
|---|---|---|---|---|---|---|---|
| 1 | 0.67 | 0.134 | 1.34 | 95 | 110 | 12.4 | 64 |
| 2 | 0.67 | 0.134 | 1.34 | 95 | 110 | 14 | 75 |
| 3 | 0.67 | 0.134 | 1.34 | 95 | 110 | 16.3 | 86 |
| 4 | 0.67 | 0.134 | 1.34 | 95 | 110 | 21 | 95.5 |
| 5 | 0.67 | 0.134 | 1.34 | 95 | 110 | 29.1 | 96 |
| 6 | 0.67 | 0.134 | 1.34 | 95 | 110 | 35.2 | 96 |

Figure 7:
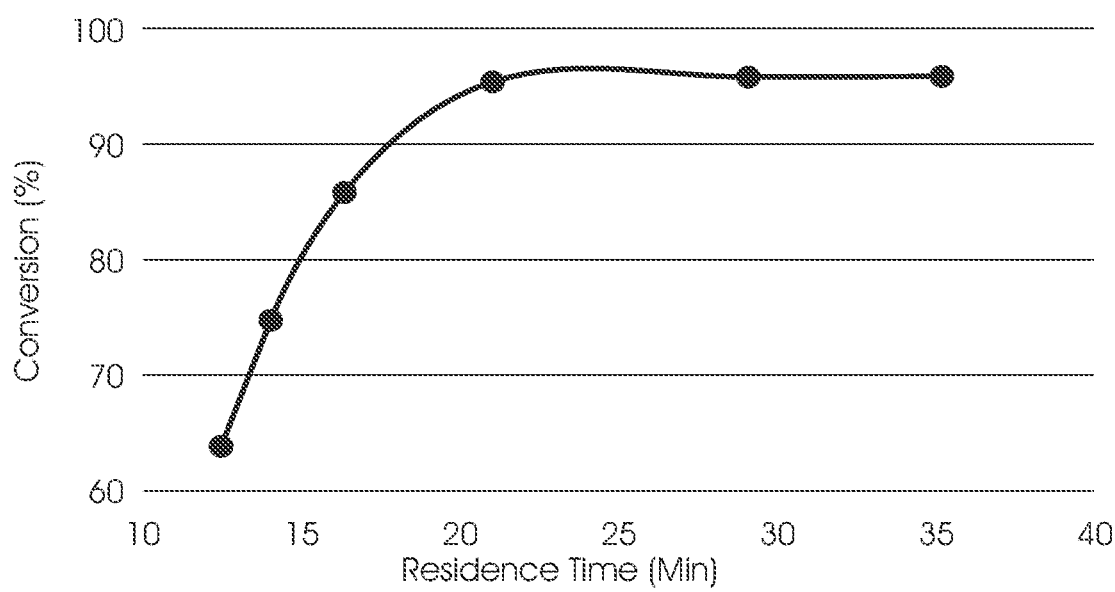
FIG. 7 shows the effect of total residence time on conversion towards 1, wherein the reaction towards 13 had a residence time set at 10 minutes.

Generally, there was gradual increase in conversion towards isonicotinyl-hydrazide 1 as residence time increased. The residence times (Rt) shown in Table 7 above are the combined residence times of the reaction towards intermediate 13, and the subsequent hydrazine reaction towards product 1. Therefore, as can be seen from Table 7 and the corresponding graph of FIG. 7, an effective residence time of 11 min (i.e. total time of 21 minutes less 10 minutes used for the first reaction towards 13) afforded a conversion of 95.5%, which improved slightly at higher residence times of 19.1 and 25.2 minutes. It was noted that there was complete selectivity of amide intermediate 13 towards product 1. Therefore, the residence time of the hydrazine reaction is in a range of from about 10 to about 25 min, including all time durations within this range, such as 10, 11, 12, 13, 14, 15, 16, 17, 18, 19, 20, 21, 22, 23, 24, and 25 minutes. Preferably, the residence time of the hydrazine reaction is in a range of from about 10 to about 20 min.

The Effect of the Concentration of Hydrazine Hydrate on Conversion Towards Isonicotinyl-Hydrazide 1

Different concentrations of hydrazine hydrate were investigated in a range between 0.67 M (1 equiv) to 1.675 M (2.5 equiv) relative to starting compound 12. A residence time of 11 min was used for the hydrazine reaction (total residence time 21 min), while the temperature for the first and second reactions were maintained at 95° C. and 110° C. respectively. Solutions of 4-cyanopyridine 12 (0.67 M), sodium hydroxide (0.134 M) and different concentrations hydrazine hydrate were used. The reaction conditions are summarised in Table 8 below. Samples were collected in vials and analysed for conversion towards 1 and selectivity using HPLC.

TABLE 8

The reaction parameters used to investigate the effect of hydrazine hydrate concentration on conversion towards product 1, wherein $R_t$ is total residence time.

| Reaction | [Hydrazine hydrate] (M) | Molar equiv relative to 12 | T (° C.) Step 1 | T (° C.) Step 2 | $R_t$ (min) | Conversion towards 1 (%) |
|---|---|---|---|---|---|---|
| 1 | 0.67 | 1.00 | 95 | 110 | 21 | 64.5 |
| 2 | 0.84 | 1.25 | 95 | 110 | 21 | 77 |
| 3 | 1.00 | 1.50 | 95 | 110 | 21 | 86 |
| 4 | 1.17 | 1.75 | 95 | 110 | 21 | 91 |
| 5 | 1.34 | 2.00 | 95 | 110 | 21 | 96 |
| 6 | 1.50 | 2.25 | 95 | 110 | 21 | 96 |
| 7 | 1.68 | 2.50 | 95 | 110 | 21 | 96 |

The results shown in Table 8 above indicates that hydrazine hydrate concentration had an effect on intermediate 13 conversion towards isonicotinyl-hydrazide 1. The amount of hydrazine hydrate used ranged between 1 to 2.5 fold relative to the starting material, 4-cyanopyrdine 12. The results show that it is quite advantageous to employ hydrazine hydrate in excess (2.0 equiv) based on the starting material. Preferably, the molar ratio of 4-cyano pyridine:hydrazine hydrate is it the range of from about 1:1.50 to about 1:2.50, more preferably in the range of from about 1:1.75 to about 1:2.25, including all subranges contained within these ranges.

The Effect of Temperature on Conversion Towards Isonicotinyl-Hydrazide 1

4-Cyanopyridine (0.67 M) was added to syringe A, sodium hydroxide (0.134 M) was added from syringe B, and hydrazine hydrate (1.34 M) from syringe C into the continuous flow system. The temperature for the first oil bath (synthesis of intermediate 13) was kept at 95° C., while the temperature for the second oil bath was varied between 90° C. to 120° C. To ensure the results obtained were due to the reaction occurring within the micro channels, there was immediate cooling of the collected samples, followed by HPLC analysis. The reaction parameters are summarised in Table 9 below.

TABLE 9

The reaction parameters used to investigate the effect of hydrazine reaction temperature on conversion towards 1.

| Reaction | [12] M | [NaOH] M | [Hydrazine hydrate] (M) | T (° C.) Step 1 | T (° C.) Step 2 | $R_t$ (min) | Conversion towards 1 (%) |
|---|---|---|---|---|---|---|---|
| 1 | 0.67 | 0.134 | 1.34 | 95 | 90 | 21 | 80 |
| 2 | 0.67 | 0.134 | 1.34 | 95 | 95 | 21 | 88 |
| 3 | 0.67 | 0.134 | 1.34 | 95 | 100 | 21 | 93 |
| 4 | 0.67 | 0.134 | 1.34 | 95 | 105 | 21 | 96.5 |
| 5 | 0.67 | 0.134 | 1.34 | 95 | 110 | 21 | 97 |
| 6 | 0.67 | 0.134 | 1.34 | 95 | 115 | 21 | 97 |
| 7 | 0.67 | 0.134 | 1.34 | 95 | 120 | 21 | 97 |

The effect of temperature in the hydrazine reaction on conversion towards isonicotinyl-hydrazide 1, is shown in the tabulated results above. The reaction temperature appeared to have a significant effect on the conversion towards 1. As the temperature increased, the amount of product 1 formed also increased non-linearly.

This above description of some of the illustrative embodiments of the invention is to indicate how the invention can be made and carried out. Those of ordinary skill in the art will know that various details may be modified thereby arriving at further embodiments, but that many of these embodiments will remain within the scope of the invention.

Units which are used in this specification and drawings, and which are not in accordance with the metric system, may be converted to the metric system with the aid of the following conversion factor:

1 psi=6,895×10³ Pa.

The invention claimed is:

1. A multistep continuous microreactor flow synthesis method for the manufacture of isonicotinyl-hydrazide of Formula 1

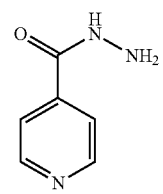

1 comprising the steps of:
a) in a first microreactor, or a first part of a suitable microreactor setup, reacting 4-cyano pyridine of Formula 12

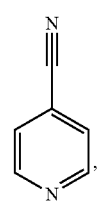

12 in a mixture of water and alcohol, with NaOH in a molar ratio of 4-cyano pyridine:NaOH of about 1:0.2 to about 1:0.4 at a temperature of about 95° C. to about 105° C. to produce the intermediate isonicotinamide of Formula 13

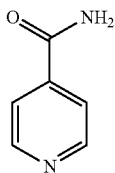

b) in a second microreactor, or a second part a suitable microreactor setup, which is in fluid communication with the first microreactor, or the first part of the microreactor, reacting the intermediate isonicotinamide of Formula 13 with hydrazine hydrate in a molar ratio of 4-cyano pyridine:hydrazine hydrate of about 1:1.75 to about 1:2.50 at a temperature of about 100° C. to about 120° C., wherein the reaction in step a) has a residence time of about 10 to about 32 minutes, the reaction in step b) has a residence time of about 10 to about 25 minutes, and the method produces the isonicotinyl-hydrazide of Formula 1 in yields greater than about 90%.

2. The method according to claim 1, wherein in step a) the 4-cyano pyridine is dissolved in a mixture of water and methanol.

3. The method according to claim 1, wherein the water and alcohol mixture has a ratio of alcohol:water of about 7:3.

4. The method according to claim 1, wherein in step a) the molar ratio of 4-cyano pyridine to NaOH is about 1:0.2.

5. The method according to claim 1, wherein in step a) the temperature is about 95° C. to about 100° C.

6. The method according to claim 5, wherein in step a) the temperature is about 95° C.

7. The method according to claim 1, wherein in step a) the residence time is about 10 to about 15 minutes.

8. The method according to claim 7, wherein in step a) the residence time is about 10 minutes.

9. The method according to claim 1, wherein in step b) the molar ratio of 4-cyano pyridine:hydrazine hydrate is about 1:1.75 to about 1:2.25.

10. The method according to claim 9, wherein in step b) the molar ratio of 4-cyano pyridine:hydrazine hydrate is about 1:2.0.

11. The method according to claim 1, wherein in step b) the temperature is about 100° C. to about 115° C., or about 105° C. to about 115° C.

12. The method according to claim 11, wherein in step b) the temperature is about 105° C.

13. The method according to claim 12, wherein in step b) the residence time is about 10 to about 20 minutes.

14. The method according to claim 13, wherein in step b) the residence time is about 10 minutes.

15. The method according to claim 1, wherein the total multistep continuous flow synthesis method yield for isonicotinyl-hydrazide from 4-cyano pyridine is greater than about 92%, greater than about 94%, or greater than about 95%.

16. The method according to claim 15, wherein the total multistep continuous flow synthesis method yield for isonicotinyl-hydrazide from 4-cyano pyridine is about 96%.

* * * * *